United States Patent
Mestery et al.

(10) Patent No.: US 12,107,937 B2
(45) Date of Patent: Oct. 1, 2024

(54) DYNAMIC PROXY PLACEMENT FOR POLICY-BASED ROUTING

(71) Applicant: Cisco Technology, Inc., San Jose, CA (US)

(72) Inventors: Kyle Andrew Donald Mestery, Woodbury, MN (US); Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/679,499

(22) Filed: Feb. 24, 2022

(65) Prior Publication Data

US 2023/0269305 A1  Aug. 24, 2023

(51) Int. Cl.
*H04L 67/56* (2022.01)
*H04L 12/54* (2022.01)
*H04L 41/0895* (2022.01)
*H04L 49/45* (2022.01)
*H04L 49/60* (2022.01)
*H04L 67/00* (2022.01)

(52) U.S. Cl.
CPC .............. *H04L 67/56* (2022.05); *H04L 12/56* (2013.01); *H04L 41/0895* (2022.05); *H04L 49/45* (2013.01); *H04L 49/60* (2013.01); *H04L 67/34* (2013.01)

(58) Field of Classification Search
CPC ..... H04L 67/56; H04L 12/56; H04L 41/0895; H04L 49/45; H04L 49/60; H04L 67/34; H04L 45/64; H04L 45/74; H04L 47/193; H04L 45/00; H04L 67/289; G06F 9/46
See application file for complete search history.

(56) References Cited

U.S. PATENT DOCUMENTS

| | | |
|---|---|---|
| 7,333,990 B1 | 2/2008 | Thiagarajan et al. |
| 7,965,630 B1 | 6/2011 | Floyd et al. |
| 9,444,725 B2 * | 9/2016 | Sella ................... H04L 41/5019 |

(Continued)

OTHER PUBLICATIONS

Huawei, "Intelligent EdgeFabric User Guide", Huawei Technologies Co., LTD. Issue 03, Nov. 30, 2021, 166 pgs.

(Continued)

*Primary Examiner* — Ramy M Osman
(74) *Attorney, Agent, or Firm* — Lee & Hayes, P.C.

(57) ABSTRACT

Techniques for operationalizing workloads at edge network nodes, while maintaining centralized intent and policy controls. The techniques may include storing, in a cloud-computing network, a workload image that includes a function capability. The techniques may also include receiving, at the cloud-computing network, a networking policy associated with an enterprise network. Based at least in part on the networking policy, a determination may be made at the cloud-computing network that the function capability is to be operationalized on an edge device of the enterprise network. The techniques may also include sending the workload image to the edge device to be installed on the edge device to operationalize the function capability. In some examples, the function capability may be a security function capability (e.g., proxy, firewall, etc.), a routing function capability (e.g., network address translation, load balancing, etc.), or any other function capability.

20 Claims, 9 Drawing Sheets

(56) References Cited

U.S. PATENT DOCUMENTS

| | | | |
|---|---|---|---|
| 9,774,611 B1* | 9/2017 | Zipperer | H04L 63/1458 |
| 11,652,872 B1* | 5/2023 | Parla | H04L 67/1008 |
| | | | 709/223 |
| 2007/0156919 A1 | 7/2007 | Potti et al. | |
| 2008/0002592 A1* | 1/2008 | Yegani | H04L 47/22 |
| | | | 370/252 |
| 2008/0304515 A1* | 12/2008 | Maeda | H04L 69/164 |
| | | | 370/466 |
| 2012/0060153 A1* | 3/2012 | Bealkowski | G06F 9/45558 |
| | | | 718/1 |
| 2013/0305046 A1* | 11/2013 | Mankovski | H04L 9/0894 |
| | | | 713/168 |
| 2016/0149774 A1* | 5/2016 | Chastain | H04L 43/028 |
| | | | 370/241 |
| 2016/0226825 A1 | 8/2016 | Ardeli et al. | |
| 2017/0034129 A1* | 2/2017 | Sawant | H04L 63/0272 |
| 2017/0142206 A1* | 5/2017 | Kodaypak | H04L 67/51 |
| 2017/0214608 A1* | 7/2017 | Jilani | H04L 45/586 |
| 2017/0289294 A1 | 10/2017 | Cohen et al. | |
| 2017/0317954 A1* | 11/2017 | Masurekar | H04L 45/586 |
| 2019/0097984 A1* | 3/2019 | Browne | H04L 63/0428 |
| 2019/0273812 A1* | 9/2019 | Kucera | H04L 67/56 |
| 2021/0051108 A1* | 2/2021 | Akman | H04L 47/2416 |
| 2021/0103456 A1* | 4/2021 | Linet | G06F 9/5077 |
| 2021/0255973 A1* | 8/2021 | Harriman | H04L 45/745 |
| 2022/0400061 A1* | 12/2022 | Neill | H04L 41/40 |
| 2024/0028414 A1* | 1/2024 | Vasanad | H04L 9/0891 |

OTHER PUBLICATIONS

The PCT Search Report and Written Opinion mailed May 22, 2023 for PCT application No. PCT/US23/12891, 11 pgs.

* cited by examiner

US 12,107,937 B2

DYNAMIC PROXY PLACEMENT FOR POLICY-BASED ROUTING

TECHNICAL FIELD

The present disclosure relates generally to techniques for, among other things, operationalizing workloads at edge network nodes, while maintaining centralized intent and policy controls.

BACKGROUND

Cloud-delivered workload solutions for enterprises are growing in popularity and utilization due to the ease in which these solutions can be scaled based on demand. Nonetheless, enterprise edge networks are still important to those enterprises who have already made substantial investments in their edge resources and appliances. However, with more of the workforce being remote, the need for scalable and elastic solutions is more important than ever. As a result, many enterprises are stuck with a decision as to whether they should move entirely to a cloud-delivered solution or if they should invest in and deploy additional physical appliances at their campus to boost on-premise capacities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
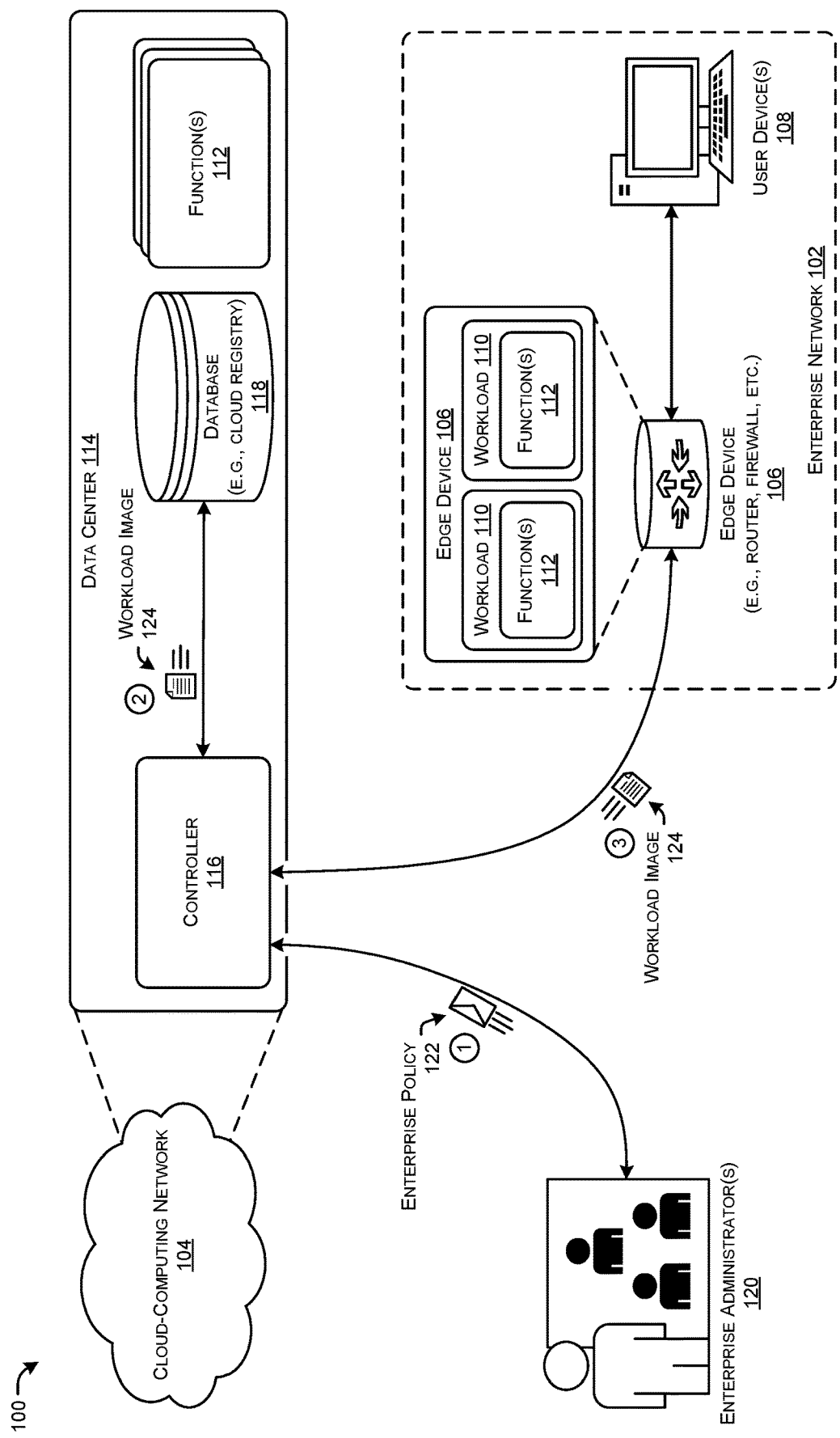
FIG. 1 illustrates an example architecture that may implement various aspects of the technologies described herein for operationalizing workloads at edge network nodes, while maintaining centralized intent and policy controls.

This disclosure describes various technologies for operationalizing workload functions at edge network nodes, while maintaining centralized intent and policy controls. By way of example, and not limitation, a method according to the technologies described herein may include storing, at a cloud-computing network, a workload image that includes a function capability. In some examples, the function capability can include one or more security function capabilities, such as a proxying capability, routing capability, firewall capability, or the like. In some examples, the method may include receiving, at the cloud-computing network, a networking policy associated with an enterprise network that is remote from the cloud-computing network. Based at least in part on the networking policy, a controller of the cloud-computing network may determine that the function capability is to be operationalized on an edge node (e.g., edge router, edge firewall, or other edge device) of the enterprise network. For example, the controller may determine that a proxy image is to be installed on the edge node for the edge node to send traffic of a data flow to a destination. The method may also include sending the workload image to the edge node. In this way, the edge node can install the workload image to operationalize the function capability on the edge node.

In some examples, the edge node may determine that the security function is needed and, in response, send a policy request to the controller. For example, the policy request may be associated with determining a specific proxy and/or proxy policy that is to be used by the edge node to send the traffic to the destination. In this way, the edge node may determine that the security function is needed and dynamically spin-up, on demand, the security function. Additionally, when the security function is no longer needed by the edge node, the edge node may remove the security function.

Additionally, the techniques described herein may be performed as a method and/or by a system having non-transitory computer-readable media storing computer-executable instructions that, when executed by one or more processors, performs the techniques described above.

EXAMPLE EMBODIMENTS

As discussed above, cloud-delivered workload solutions for enterprises are growing in popularity and utilization due to the ease in which these solutions can be scaled based on demand. Nonetheless, enterprise edge networks are still important to those enterprises who have already made substantial investments in their edge resources and appliances. However, with more of the workforce being remote, the need for scalable and elastic solutions is more important than ever. As a result, many enterprises are stuck with a decision as to whether they should move entirely to a cloud-delivered solution or if they should invest in and deploy additional physical appliances at their campus to boost on-premise capacities.

For instance, the largest cost of cloud-computing is typically associated with ingress and egress transits. As such, in the context of cloud-delivered security solutions, routing a packet all the way to a cloud-computing node simply to drop the packet at a cloud-delivered firewall results in unnecessary costs, such as transit expenses, decreased bandwidth in the flow, and a waste of cloud-delivered compute resources. These unnecessary costs are not only incurred by the customer, but they are also incurred by the cloud-based security provider, even when the provider owns the cloud data center where the security workloads run. Accordingly, one aspect of this disclosure is directed to technologies that assist with this problem by splitting the control plane and data plane components of cloud-delivered functions (e.g., security functions) to allow them to be operationalized at the edge (e.g., enterprise edge), while maintaining centralized intent, policy, and control.

In some examples, these cloud-delivered workload functions may be container images, virtual machine images, P4-functions (e.g., for SmartNICs), Lambda functions, or the like. In some examples, the cloud-delivered workload functions may be deployed, orchestrated, and operationalized at the edge (e.g., enterprise edge or other edge network) from a central delivery and control point in a cloud-computing network based on policies and/or intents. That is, one or more images and/or functions (e.g., security workloads) may be stored in the cloud (e.g., in a cloud registry) and delivered to the edge based on policies/intents that dictate the need for the security function(s) to be operationalized. Once deployed, the one or more images and/or functions may be operationalized and configured (e.g., spun-up and provisioned) when needed, as well as spun-down when no longer required at the edge node. In some examples, caching may be used as a means of retaining images locally at the edge node that are likely to be redeployed and operationalized in the future based on policies, machine-learning techniques (e.g., likeliness of reuse), or the like.

In some examples, the images and/or functions may have specific hardware requirements that dictate whether they can be operationalized on particular network components. For example, if one edge device has a graphic processing unit (GPU) and another does not, a workload may be placed on the GPU-enabled edge device if it is required. In some examples, each image may have one or more function capabilities. For instance, an image could include an intrusion detection system (IDS) security function, a firewall function, a remote-access function, a proxying function, a deep packet inspection (DPI) function, a routing function, a network address translation (NAT) function, a domain name system (DNS) function, a load balancing function, or the like.

Additionally, another example of how the technologies of this disclosure can be used is in the case of proxies. Currently, proxies are deployed in very static ways. Proxies are typically statically configured and usually run in pairs for high availability (HA) purposes. In some instances, proxies can exist as software only (e.g., Nginx, HAProxy, open source proxies, etc.) or, alternatively, as hardware appliances from companies such as Cisco, F5, Palo Alto Networks, etc. Proxies have existed as part of the backbone of the internet, especially as it pertains to web traffic. However, the technologies disclosed herein provide for dynamically controlling the creation and deletion of proxies in an efficient manner, as needed. For instance, the disclosed technologies include techniques for dynamically detecting the presence of supported flows (e.g., at an edge node), as well as the creation of dynamic proxies to support various protocols (e.g., HTTP, QUIC, MASQUE, TLS, etc.) to provide policy enforcement based on first packet inspection.

As an example, a user from their home network may use a supported protocol to request access to a resource located in their branch office network. The WiFi router of the home network may use first packet inspection techniques to look at the initial packet and understand where the packet is going (e.g., based on an SNI value for TLS packets, an initial QUIC connection packet, a host header in a proxied connection, a MASQUE identifier, or any other approach/technique that could also be used for load-balancing). Once the packet is understood by the WiFi router, the WiFi router may utilize a connection to a centralized controller to pull down and install the appropriate proxy image. This proxy image, in some examples, could be run as a virtual machine, a container, a serverless function, or the like, and may be run directly on the WiFi router. In some examples, policies associated with the proxy may be obtained from the centralized controller as well, and the proxy policy may be to do load balancing, caching, selective policy (e.g., allow packets, deny packets, etc.), or the like. In some examples, once the proxy is installed, traffic may flow from the home office network to the resources of the branch office network.

Utilizing the techniques described herein for the dynamic proxy creation, there is no need to break packet encryption on the proxy virtual machines/containers/serverless functions, as the packets may be routed using information outside of the encrypted portion of the packets. Additionally, using the disclosed technologies enables the ability to perform protocol downgrades in order to enhance visibility. In other words, a packet's protocol could be downgraded from QUIC to HTTP, for example, to allow for more rich policy to be applied past the proxy.

By way of example, and not limitation, a method according to the technologies described herein for splitting the control plane and data plane components of cloud-delivered functions to allow them to be operationalized at edge network nodes, while maintaining centralized intent, policy, and control may include storing, in a cloud-computing network, a workload image that includes a function capability. In some examples the workload image may be one of multiple workload images that are stored in a database associated with the cloud-computing network. For instance, the database may be a cloud registry that is analogous to a docker registry. In some examples, the workload image may include a virtual machine image, a container image, a Programming Protocol-Independent Packet Processors (P4) function, a Lambda function, a serverless function, or the like. Additionally, in some examples the function capability may be a security function capability, such as a firewall capability, a remote-access capability, a proxying capability, an IPS capability, a DPI capability, or the like. Additionally, or alternatively, the function capability may be a networking function capability, such as a packet routing capability, a NAT capability, a load balancing capability, a DNS capability, or the like. In some examples, the workload image may include one or multiple of these function capabilities.

In some examples, the method may include receiving, at the cloud-computing network, a networking policy associated with an enterprise network that is remote from the cloud-computing network. In some example, the networking policy may include a collection of rules that govern the behaviors of the enterprise network devices. That is, the networking policy may indicate how certain enterprise network devices are to operate, function(s) that the enterprise devices are to perform, specific personas of the enterprise network devices (e.g., router, firewall, proxy, remote access, etc.), capacity constraints for the enterprise devices, or the like. In some examples, administrators of the enterprise network may define the policies for enterprise network devices to follow to achieve business objectives. In some examples, the networking policy may indicate one or more sets of conditions, constraints, and/or settings that designate who (e.g., which users and/or devices) is authorized to connect to the enterprise network or other networks, as well as the circumstances under which they can or cannot connect.

In some examples, the method may include determining, at the cloud-computing network, that the function capability is to be operationalized on an edge device of the enterprise network. In some examples, determining that the function capability is to be operationalized at the edge device may be based at least in part on the networking policy. In some examples, a centralized controller hosted on the cloud-computing network may analyze the networking policy and make the determination that the function capability is to be operationalized on the edge device. In some examples, multiple function capabilities may be determined to be operationalized based at least in part on the policy. In some examples, a best location of where the function capability is to be operationalized with respect to the enterprise network may also be determined at the cloud-computing network. In some examples, the best location may be determined based at least in part on the networking policy, a network optimization, intent, or the like.

In some examples, the edge device may be part of an enterprise edge network, an enterprise branch office network, a home office network, or the like. In some examples, the method may include sending the workload image to the edge device. In this way, the workload image may be installed on the edge device to operationalize the function capability. In some examples, the edge device may be a generic edge device (e.g., a persona-less device) or a specific persona device (e.g., an edge router device, an edge firewall device, etc.), and installing the workload image may transform a persona of the edge device (e.g., from a persona-less device to a specific persona device, from a specific persona device to a multiple persona device, or the like).

In some examples, changes to the enterprise networking policy may be detected dynamically, and the centralized controller of the cloud-computing network may determine, also dynamically, that a function capability is to be operationalized on one or more edge device(s) based at least in part on the change to the networking policy. Additionally, in some examples, the controller of the cloud-computing network may determine that the function capability is no longer needed. For instance, the controller may determine, based at least in part on the networking policy or a change to the networking policy, to remove the workload image from running on the edge device. Additionally, in some examples the controller may cause the edge device to uninstall the workload image to remove the function capability.

As noted above, the disclosed technologies also include techniques for dynamically detecting the presence of supported flows (e.g., at an edge node), and dynamically operationalizing proxies to support various protocols (e.g., HTTP, QUIC, MASQUE, TLS, etc.) and provide policy enforcement based on first packet inspections. By way of example, and not limitation, a method according to the technologies described herein for the dynamic creation of proxies may include receiving, at an edge device, a packet associated with a data flow between the edge device and a destination. In some examples, the edge device may be part of an enterprise network. For instance, the edge device may be a WiFi router of a home office network or a branch office network that is an extension of, or otherwise associated with the enterprise network. In some examples, the data flow may be an HTTP flow, a QUIC flow, a MASQUE flow, a TLS flow, or another flow between the edge device and the destination. As such, a protocol associated with the packet may be an HTTP protocol, a QUIC protocol, a MASQUE protocol, a TLS protocol, or any other protocol that may be used for load balancing purposes.

In some examples, the method may include determining, by the edge device, that a proxy is to be used to send the packet to the destination. In some examples, the edge device may determine that the proxy is to be used to send the packet to the destination based at least in part on using first packet inspection techniques. For instance, the edge device may determine that the packet is of a supported protocol (e.g., HTTP, QUIC, MASQUE, etc.) and, based at least in part on the protocol of the packet, determine that the proxy is to be used to send the packet. Additionally, or alternatively, the edge device may determine that the proxy is to be used based at least in part on the destination indicated in the packet. In some examples, the destination may be in the enterprise network, in a constituent network of the enterprise network, an internet destination, a cloud-native service, or any other remote destination.

In some examples, based at least in part on determining that the proxy is to be used to send the packet to the destination, the edge device may determine a specific proxy that is to be used to send the packet. In some examples, the edge device may utilize the centralized controller of the cloud-computing network to determine the specific proxy to be used. For instance, the edge device may communicate with the centralized controller information associated with the packet, the data flow, the destination, the user device that sent the packet, or the like, and the centralized controller may determine the specific proxy to be used to send the packets of the data flow. In some examples, the centralized controller may determine the specific proxy to be used based at least in part on the networking policy associated with the enterprise network, a network optimization associated with the enterprise network, or the like.

In some examples, the centralized controller may select a workload image (e.g., a proxy image) associated with the specific proxy. In some examples, the centralized controller may obtain the proxy image from a cloud registry and send the proxy image to the edge device. In other examples, the centralized controller may send an indication of the specific proxy and/or the proxy image to the edge device, and the edge device may obtain the proxy image from a memory or cache accessible to the edge device. In any of these examples, after obtaining the proxy image, the edge device may install the proxy image on the edge device to operationalize the specific proxy. In additional examples, the proxy image may be running on the cloud-computing network, and the edge device may redirect the packets of the data flow to the proxy running on the cloud-computing network, rather than installing the proxy locally. In other examples, the proxy image may be running at a different location of the enterprise network, and the edge device may redirect the packets to that location for proxy steering and policy application.

In some examples, a policy associated with the proxy may include one or more of load balancing traffic, caching, allowing traffic to flow to the destination, denying traffic from flowing to the destination, or the like. Additionally, in some examples, the method may include determining that a proxy is no longer needed and uninstalling proxy images from running on various edge devices. For instance, if the controller and/or the edge device determines that the data flow is inactive the proxy image may be uninstalled from running on the edge device.

In some examples, the cloud-computing network may include a workload or policy server that is configured to deliver workloads, functions, etc. to the edge device based on decisions made by the controller. For instance, the controller may make a decision to install a workload on the edge device, and the controller may signal to the workload/policy server to deliver the workload to the edge device.

According to the techniques described herein, several improvements in computer-related technology can be realized. For instance, the techniques described herein allow for enterprises to dynamically operationalize workloads at various locations in their networks when needed to meet policy requirements. Additionally, by utilizing the techniques described herein for dynamic proxy creation, there is no need to break packet encryption on the proxy virtual machines/containers/serverless functions, as the packets may be routed using information outside of the encrypted portion of the packets. Additionally, using the disclosed technologies enables the ability to perform protocol downgrades in order to enhance visibility. In other words, a packet's protocol could be downgraded from QUIC to HTTP, for example, to allow for more rich policy to be applied past the proxy. Furthermore, by operationalizing security workloads at edge network nodes, unnecessary costs (e.g., transit expenses, flow bandwidth utilization, compute resource utilization, etc.) associated with routing packets to the cloud to perform the security function can be reduced. Additionally, other advantages not explicitly listed will be readily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein for operationalizing workloads at edge network nodes, while maintaining centralized intent and policy controls. The architecture 100 includes an enterprise network 102 and a cloud-computing network 104 that is remote and logically distinct from the enterprise network 102.

In examples, the enterprise network 102 is an information technology (IT) infrastructure that organizations use to provide connectivity among users, devices, and applications. The goal of the enterprise network 102 may be to support the organizations' objectives by consistently delivering connected digital services reliably and securely to workers, partners, customers, things, etc. In some examples, the enterprise network 102 may include separate but connected constituent domains. Typically, each constituent network of the enterprise network 102 may be designed, provisioned, and optimized for its own purpose and business objectives. Example constituent network types may include (a) campus networks, branch networks, and Internet of Things (IoT) networks (e.g., which may provide fixed and mobile access to users and things, may be present in all areas of an organization, both in offices and in operational spaces such as manufacturing and warehouse facilities, and may be optimized for transparent, secure access and high density), (b) data center and hybrid cloud networks (e.g., which may connect to and among applications, workloads, and data, within on-premises data centers and private and public cloud services, and may be optimized for low latency, security, and mission-critical reliability), (c) wide-area networks (WANs) (e.g., which may connect facilities, buildings, or campuses to other branches, to data centers, or to cloud resources, and may be optimized for user experience and bandwidth efficiency), or the like. The enterprise network 102 of FIG. 1 may be representative of any one of these example constituent network types, as well as other network types not explicitly listed.

As shown in FIG. 1, the enterprise network 102 includes an edge device 106 and one or more user device(s) 108. In some examples, the edge device 106 may be representative of multiple edge devices 106 or edge nodes of the enterprise network 102. For instance, the edge device 106 may represent one or more edge routers, edge firewalls, edge proxies, edge compute nodes, or other edge devices. The edge device 106 may include functionality to host one or more workloads 110, and the one or more workloads 110 may be used to run one or more function(s) 112. In some examples, an individual workload 110 may run one or multiple function(s) 112. In some examples, the user device(s) 108 of the enterprise network 102 may send and received traffic from outside of the enterprise network 102 via the edge device 106. Additionally, in some examples, individual constituent networks (e.g., home office networks, campus networks, branch networks, etc.) of the enterprise network 102 may also include one or more edge devices 106 for sending and receiving traffic outside of the constituent network.

In some examples, the workloads 110 may be running on the edge device 106 as a virtual machine, a container, a P4 function, a Lambda function, a serverless function, or the like. Additionally, in some examples the function(s) 112 may be associated with one or more capabilities. For instance, the function(s) 112 may be security functions, such as a firewall function, a remote-access function, a proxying function, an IPS function, a DPI function, or the like. Additionally, or alternatively, the function(s) 112 may be networking functions, such as packet routing functions, NAT function, a load balancing function, a DNS function, or the like. However, although described in the context of security functions and routing functions, the function(s) 112 may be any type of function.

In some examples, the cloud-computing network 104 may include one or more data centers, such as the data center 114. The one or more data centers may be physical facilities or buildings located across geographic areas that are designated to store computing resources associated with the cloud-computing network 104. The one or more data centers may include various networking devices, as well as redundant or backup components and infrastructure for power supply, data communication connections, environmental controls, internet-of-things devices, services, and various security devices. In some examples, the data centers may be virtual data centers which are a pool or collection of cloud infrastructure resources specifically designed for enterprise needs, and/or for cloud-based service provider needs. Generally, the data centers of the cloud-computing network (physical and/or virtual) may provide basic resources such as processor (CPU), memory (RAM), storage (disk), networking (bandwidth), workload delivery, and the like. However, in some examples the devices of the cloud-computing network 104 may not be located in explicitly defined data centers but may be located in other locations or buildings.

The data center 114 of the cloud-computing network 104 may include one or more server devices or other resources that host the components shown in FIG. 1, as well as other components not shown or explicitly described herein. In some examples, resources of the data center 114 may host a controller 116, a database 118, and one or more function(s) 112.

In some examples, the controller 116 may be a centralized controller associated with the enterprise network 102. That is, the controller 116 may be a central point of intelligence for policy application for all constituent networks associated with the enterprise network 102. In some examples, the controller 116 may make policy decisions on behalf of the enterprise network 102 as to which workloads 110 and/or function(s) 112 should be run on the edge device 106, which function(s) 112 the enterprise network 102 should utilize remotely in the data center 114, and the like. In other words, the controller 116 may make decisions, based on policy, intent, network optimizations, or the like, as to which function(s) 112 the enterprise network 102 should run locally on its own enterprise appliances, and which function(s) 112 should remain in the cloud-based network and not be operationalized on the appliances (e.g., the edge device 106 or user device(s) 108) of the enterprise network 102.

In some examples, the database 118 of the cloud-computing network 104 that is hosted in the data center 114 may store one or more workload images, policy images, or other source code or machine code that can be used for running the function(s) 112. In some examples, the database 118 may be configured as a cloud registry (e.g., similar to a docker registry).

In some examples, the function(s) 112 running on the resources of the data center 114 may be similar to or the same as the function(s) 112 run by the workloads 110 of the edge device 106. For instance, the function(s) 112 may be security functions, such as a firewall function, a remote-access function, a proxying function, an IPS function, a DPI function, or the like. Additionally, or alternatively, the function(s) 112 may be networking functions, such as packet routing functions, NAT function, a load balancing function, a DNS function, or the like. However, although described in the context of security functions and routing functions, the function(s) 112 may be any type of cloud-delivered function.

Although not shown in FIG. 1, the data center 114 may also include a workload or policy server that is configured to deliver the workload image 124 to the edge device 106 based on decisions made by the controller 116. For instance, the controller 116 may make a decision to install a workload image 124 on the edge device 106, and the controller 116 may signal to the workload/policy server to deliver the workload image 124 to the edge device 106.

FIG. 1 also illustrates various example "steps" associated with a process associated with operationalizing a function 112 on the edge device 106 of the enterprise network 102. At step "1," enterprise administrator(s) 120 may send, to the controller 116, an enterprise policy 122 associated with the enterprise network 102. The enterprise policy 122 may include a networking policy associated with the enterprise network 102. That is, the enterprise policy 122 may include a collection of rules that govern the behaviors of the enterprise network 102 devices, such as the edge device 106 and the user device(s) 108. For instance, the enterprise policy 122 may indicate how certain enterprise network 102 devices are to operate, function(s) 112 that the enterprise devices are to perform, specific personas of the enterprise network devices (e.g., router, firewall, proxy, remote access, etc.), capacity constraints for the enterprise devices, or the like. In some examples, the enterprise administrator(s) 120 may define the enterprise policy 122 for the enterprise network 102 devices to follow to achieve business objectives. In some examples, the enterprise policy 122 may indicate one or more sets of conditions, constraints, and/or settings that designate who (e.g., which users and/or devices) is authorized to connect to the enterprise network 102 or other networks, as well as the circumstances under which they may or may not connect.

At "2," based at least in part on receiving the enterprise policy 122, the controller 116 may determine one or more function(s) 112 that are to be operationalized at the enterprise network 102 to meet the requirements of the enterprise policy 122. Additionally, the controller 116 may select a workload image 124 to be installed on the enterprise network 102 appliances. In some examples, the controller 116 may obtain the workload image 124 from the database 118. The workload image 124 may include one or more of the function(s) 112 or may otherwise be configured for running the function(s) 112 on the devices of the enterprise network 102. In some examples, the controller 116 may obtain multiple workload images 124 that are to be installed on the enterprise network 102 appliances, and each individual workload image 124 may include one or more function(s) 112.

At "3," the controller 116 may send the workload image 124 (or multiple workload images) to the edge device 106 of the enterprise network 102. In this way, the edge device 106 may install the workload image 124 to operationalize one or more function(s) 112. Although shown as being operationalized on the edge device 106 of the enterprise network 102 for simplicity and ease of understanding, it is to be understood that the workload image 124 may be installed on any device of the enterprise network 102, including edge nodes of constituent networks (e.g., home office networks, branch office networks, campus networks, or the like), the user device(s) 108, generic routing nodes of the enterprise network 102, or the like.

In some examples, the controller 116 may determine that a function is no longer needed by the enterprise network 102. For instance, the controller 116 may receive a change to the enterprise policy 122 from the enterprise administrator(s) 120. In such examples, the controller 116 may cause workload images 124 to be uninstalled from the enterprise network 102 appliances in order to free up space on the appliances.

Figure 2:
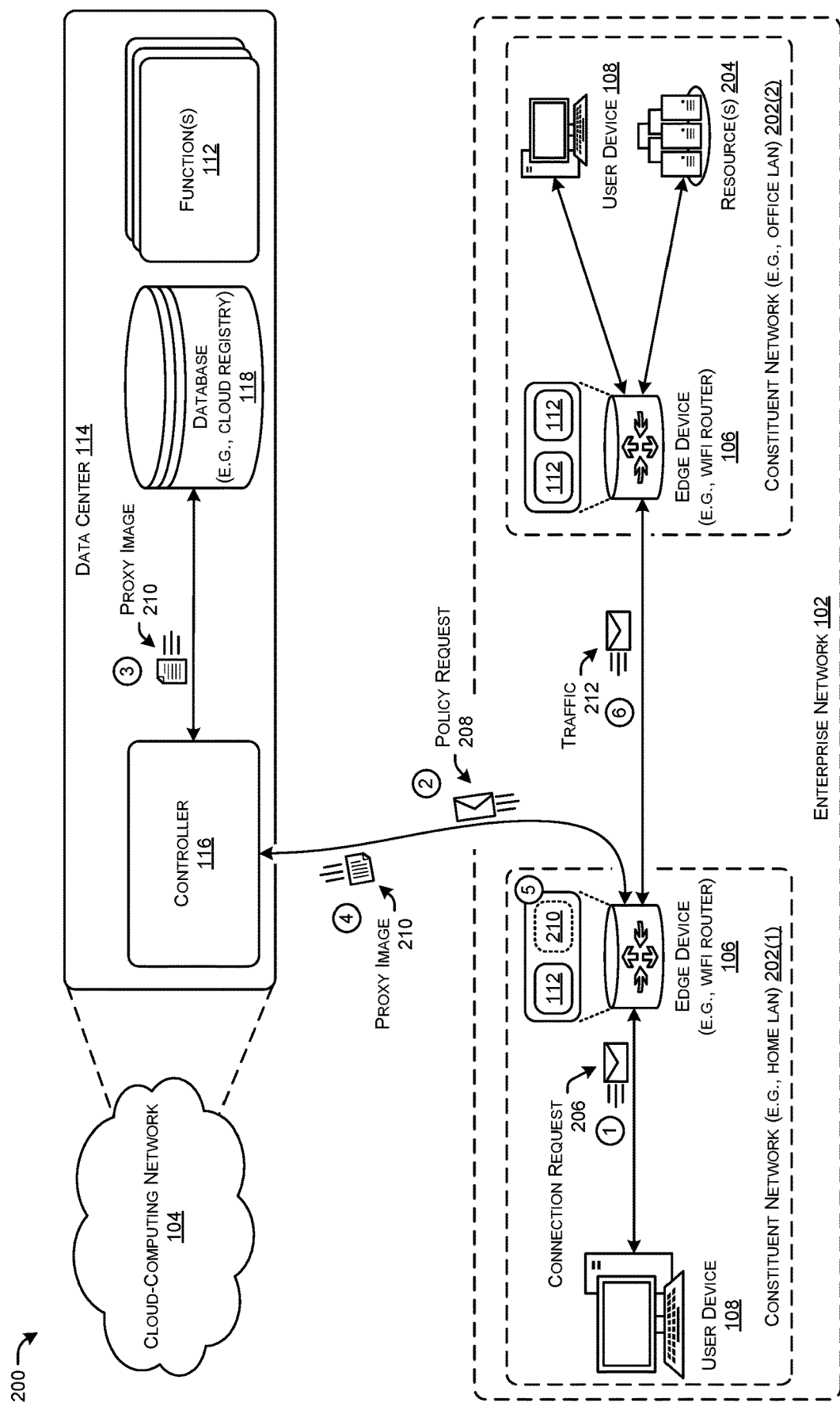
FIG. 2 illustrates an example process performed by the example architecture in which a security function is dynamically placed at an edge network node.

FIG. 2 illustrates an example architecture 200 performing steps of an example process in which a security function is dynamically placed at an edge network node of the enterprise network 102. As shown in FIG. 2, the enterprise network 102 includes a first constituent network 202(1), which may be a home office local area network (LAN), and a second constituent network 202(2), which may be a branch office LAN, campus network, enterprise data center, or the like.

The first constituent network 202(1) and the second constituent network 202(2) may be hereinafter referred to collectively as "constituent networks 202." In examples, the enterprise network 102 can include any number of constituent networks similar to the constituent networks 202. Additionally, each of the constituent networks 202 may include one or more devices or nodes, such as the edge devices 106 (which may be representative of a Wi-Fi router, firewall, or any other edge device), the user devices 108, and the resource(s) 204 (e.g., servers, memory, or the like).

At "1," the user device 108 of the first constituent network 202(1) may send a connection request 206 associated with establishing a connection to consume one of the resource(s) 204 of the second constituent network 202(2). In some examples, the edge device 106 may determine that a proxy is to be used to send the traffic to second constituent network 202(2). For instance, packets of the connection request 206 may be of a supported protocol (e.g., HTTP/1, HTTP/2, HTTP/3, QUIC, MASQUE, TLS, etc.) and the edge device 106 may analyze the connection request 206 (e.g., using first packet inspection techniques or similar technologies) to determine where the traffic is going. For instance, the edge device 106 may determine where the traffic is going based on an SNI value for TLS packets, an initial QUIC connection packet, a host header in a proxied connection, a MASQUE identifier, or any other approach/technique that could also be used for load-balancing.

At "2," once the connection request 206 is understood by the edge device 106, the edge device 106 may utilize a connection to the controller 116 of the cloud-computing network 104 to send a policy request 208. In some examples, the policy request 208 may be a request for the controller 116 to provide a proxy image or indication of a proxy to be used for sending the traffic. In some examples, the policy request 208 may include an indication of the user device 108 that generated the connection request 206, an indication of the destination of the traffic, an indication of a resource requested by the user device 108, an indication of the first constituent network 202(1) in which the user device 108 resides, an indication of the second constituent network 202(2) in which the destination resides, an indication of the protocol to be used, or the like.

At "3," based at least in part on receiving the policy request 208, the controller 116 may determine a proxy image 210 (e.g., which may be a workload image including a proxy function) to be used. In some examples, the controller 116 may determine the specific proxy image based on the information included in the policy request, as well as other information known by the controller about the enterprise network 102, which may have been included in the enterprise policy 122 described with reference to FIG. 1 above. In some examples, the controller 116 may obtain the proxy image 210 from the database 118 of the cloud-computing network 104. In various examples, the proxy image 210 may be run as a virtual machine, a container, a serverless function, or the like. In some examples, a proxy policy of the proxy image may be to do load balancing, caching, selective policy (e.g., allow packets, deny packets, etc.), or the like, and the proxy policy may be configured, in some cases, by the controller 116.

At "4," the proxy image 210 may be sent to the edge device 106 by the controller 116. And, at "5," the proxy image 210 may be installed on the edge device 106 to operationalize the proxy functionality directly on the edge device 106. In this way, the edge device may, at "6," use the proxy to send the traffic 212 to the destination (e.g., the resource(s) 204 or the user device 108 of the second constituent network 202(2). In some examples, the edge device 106 may utilize the proxy to perform load balancing, caching, selective policy (e.g., allow packets, deny packets, etc.), or the like. Additionally, if the edge device 106 or the controller 116 determines that the proxy image 210 is no longer needed to be installed on the edge device 106, the proxy image 210 may be uninstalled or otherwise removed from running on the edge device 106.

Figure 3:
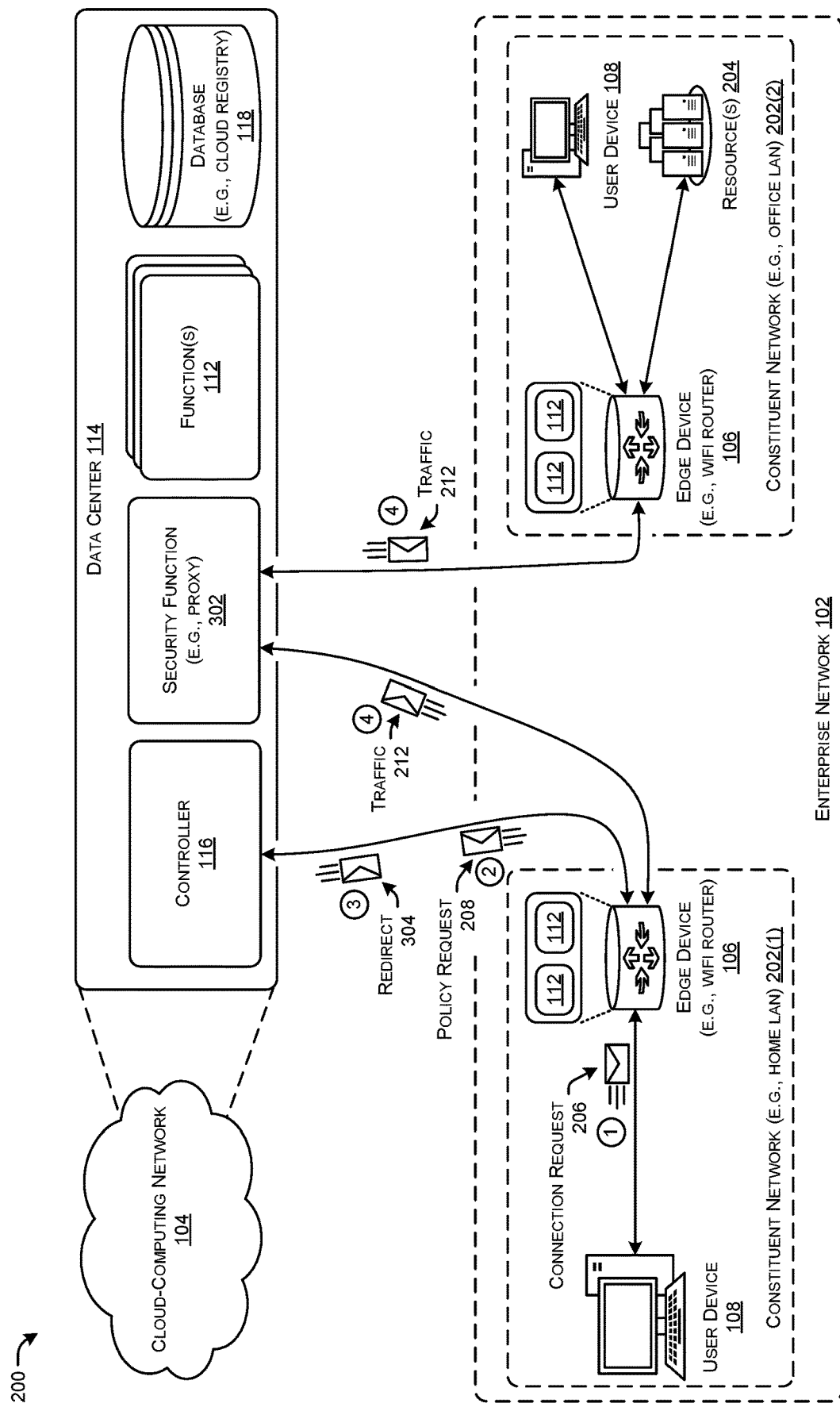
FIG. 3 illustrates an example process performed by the example architecture in which traffic of a data flow is routed through a cloud-native security function.

FIG. 3 illustrates the example architecture 200 performing steps of another example process in which traffic of a data flow is routed through a cloud-native security function. At "1," the user device 108 of the first constituent network 202(1) may send a connection request 206 associated with establishing a connection to consume one of the resource(s) 204 of the second constituent network 202(2). In some examples, the edge device 106 may determine that a security function is to be applied to the traffic that is to be sent to the second constituent network 202(2). For instance, packets of the connection request 206 may be of a supported protocol (e.g., HTTP/1, HTTP/2, HTTP/3, QUIC, MASQUE, TLS, etc.) and the edge device 106 may analyze the connection request 206 (e.g., using first packet inspection techniques or similar technologies) to determine where the traffic is going. For instance, the edge device 106 may determine where the traffic is going based on an SNI value for TLS packets, an initial QUIC connection packet, a host header in a proxied connection, a MASQUE identifier, or any other approach/technique that could also be used for load-balancing.

At "2," once the connection request 206 is understood by the edge device 106, the edge device 106 may utilize a connection to the controller 116 of the cloud-computing network 104 to send a policy request 208. In some examples, the policy request 208 may be a request for the controller 116 to identify one or more security function(s) that are to be applied to the traffic. In some examples, the policy request 208 may include an indication of the user device 108 that generated the connection request 206, an indication of the destination of the traffic, an indication of a resource requested by the user device 108, an indication of the first constituent network 202(1) in which the user device 108 resides, an indication of the second constituent network 202(2) in which the destination resides, an indication of the protocol to be used, or the like.

At "3," based at least in part on receiving the policy request 208, the controller 116 may determine that a security function 302 is to be applied to the traffic of the data flow and send a redirect 304 to the edge device 106 so that the edge device 106 steers the traffic 212 to the security function 302. In some examples, the controller 116 may determine the security function 302 based on the information included in the policy request, as well as other information known by the controller about the enterprise network 102, which may have been included in the enterprise policy 122 described with reference to FIG. 1 above. In some examples, the controller 116 may spin-up and run the security function 302 on the cloud-computing network 104 in response to the policy request 208 or, in other examples, the security function 302 may already be running. In various examples, the security function 302 may be run as a virtual machine, a container, a serverless function, or the like. In some examples, the security function 302 may be a proxy function, a routing function, a firewall function, a NAT function, a DNS function, a DPI function, or the like. In at least one examples, the security function 302 is a proxy function that performs load balancing, caching, selective policy (e.g., allow packets, deny packets, etc.), or the like.

At "4," the edge device 106 may send the traffic 212 to the security function 302. Responsive to receiving the traffic 212, the security function 302 may inspect or otherwise operate on the traffic 212, and then, if appropriate, forward the traffic 212 to the edge device 106 of the second constituent network 202(2). In some examples, if the controller 116 determines that the security function 302 is no longer needed (e.g., security function 302 sitting idle for more than a threshold period of time, no policies require use of the security function 302, or the like), then the controller 116 may cause the security function 302 to be removed from running on the resources of the cloud-computing network 104.

FIGS. 4A-6 are flow diagrams illustrating example methods associated with the techniques described herein. The logical operations described herein with respect to FIGS. 4A-6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 4A-6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 4A:
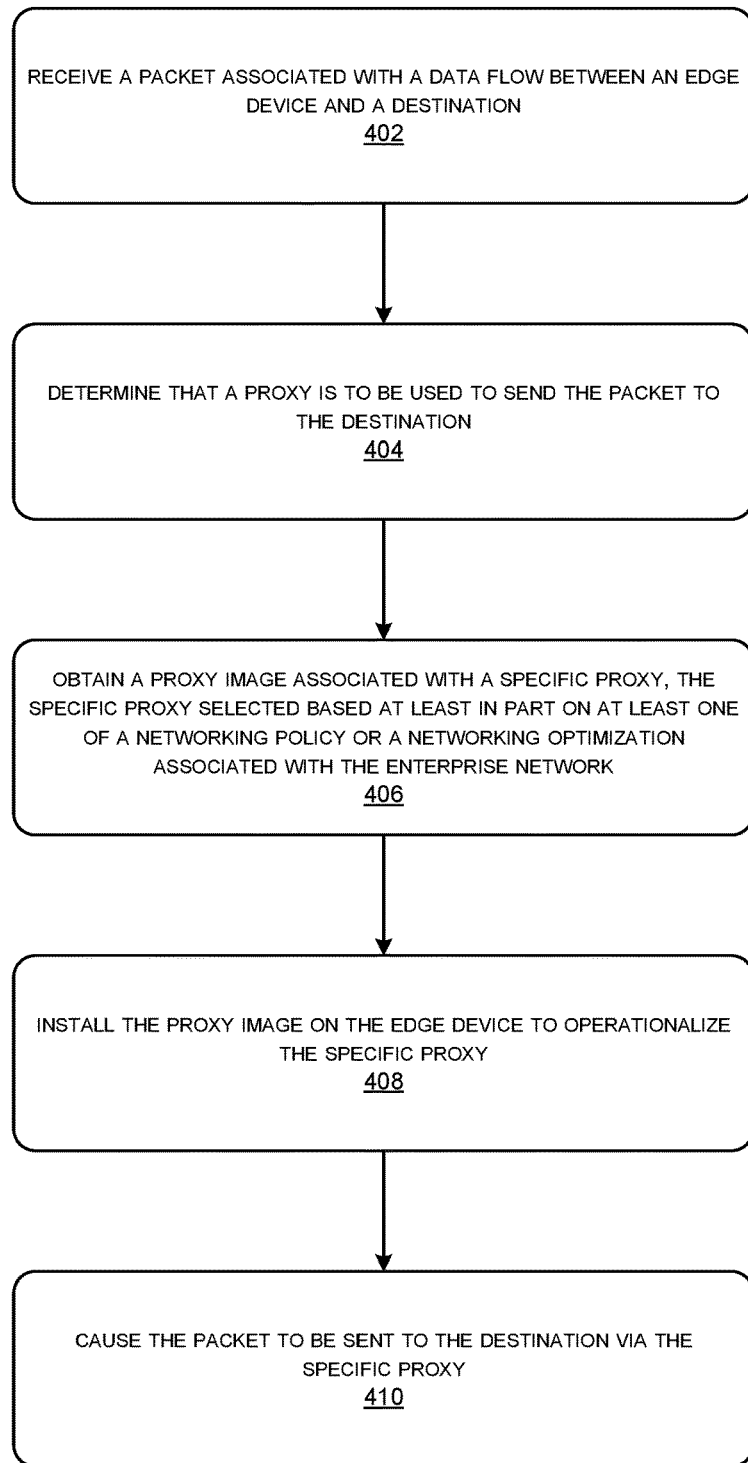
FIG. 4A is a flow diagram illustrating an example method associated with operationalizing a proxy function at an edge network node, while maintaining centralized intent and policy controls in a cloud-computing network.

FIG. 4A is a flow diagram illustrating an example method 400 associated with operationalizing a proxy function at an edge network node, while maintaining centralized intent and policy controls in a cloud-computing network. The method 400 begins at operation 402, which includes receiving a packet associated with a data flow between an edge device and a destination. For instance, the edge device 106 of the first constituent network 202(1) may receive a packet associated with a data flow between the edge device 106 and a resource or device of the second constituent network 202(2).

At operation 404, the method 400 includes determining that a proxy is to be used to send the packet to the destination. For instance, the edge device 106 of the first constituent network 202(1) may determine that the proxy is to be used to send the packet to the resource or device of the second constituent network 202(2). In some examples, the determination that the proxy is to be used may be based at least in part on performing a first packet inspection technique or similar technique to determine the destination of the packet. For instance, the destination could be an internet destination, an enterprise destination, a cloud destination, or the like.

At operation 406, the method 400 includes obtaining a proxy image associated with a specific proxy, the specific proxy selected based at least in part on at least one of a networking policy or a networking optimization associated with the enterprise network. For instance, the edge device 106 of the first constituent network 202(1) may obtain the proxy image 210 associated with the specific proxy. Additionally, in some examples, the specific proxy may be selected by the controller 116 of the cloud-computing network based at least in part on the enterprise policy 122, the policy request 208, or a networking optimization.

At operation 408, the method 400 includes installing the proxy image on the edge device to operationalize the specific proxy. For instance, the edge device 106 of the first constituent network 202(1) may install the proxy image to operationalize the specific proxy functionality. In some examples, the proxy image may be ran on the edge device as a virtual machine, a serverless function, a lambda function, a container, a workload function, or the like.

At operation 410, the method 400 includes causing the packet to be sent to the destination via the specific proxy. For instance, the edge device 106 of the first constituent network 202(1) may cause the packet to be sent to the resource or device of the second constituent network 202(2) via the specific proxy. In some examples, the specific proxy may perform load balancing, caching, selective policy, or the like with respect to traffic of the data flow.

Figure 4B:
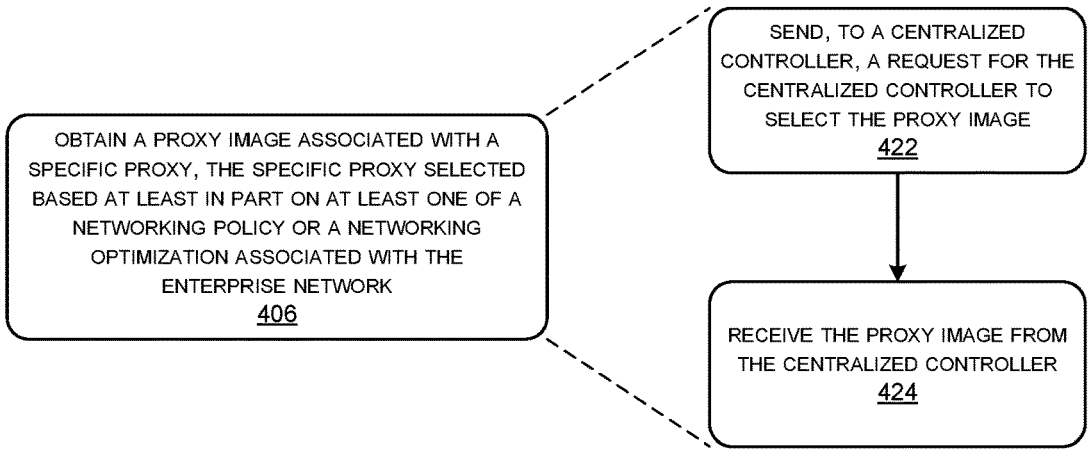
FIG. 4B is a flow diagram illustrating an example method associated with obtaining a proxy image.

FIG. 4B is a flow diagram illustrating an example method 420 associated with operation 406 of the method 400 for obtaining the proxy image associated with the specific proxy. The method 420 begins at operation 422, which includes sending, to a centralized controller, a request for the centralized controller to select the proxy image. For instance, the edge device 106 of the first constituent network 202(1) may send the request to the controller 116 of the cloud-computing network. In some examples, the request may include a policy request 208.

At operation 424, the method 420 includes receiving the proxy image from the centralized controller. For instance, the controller 116 may select the proxy image 210 based on the policy request 208 and/or the enterprise policy 122, and then send the proxy image 210 to the edge device 106. In some examples, the controller 116 may obtain the proxy image 210 form the database 118, which may be a cloud registry.

Figure 4C:
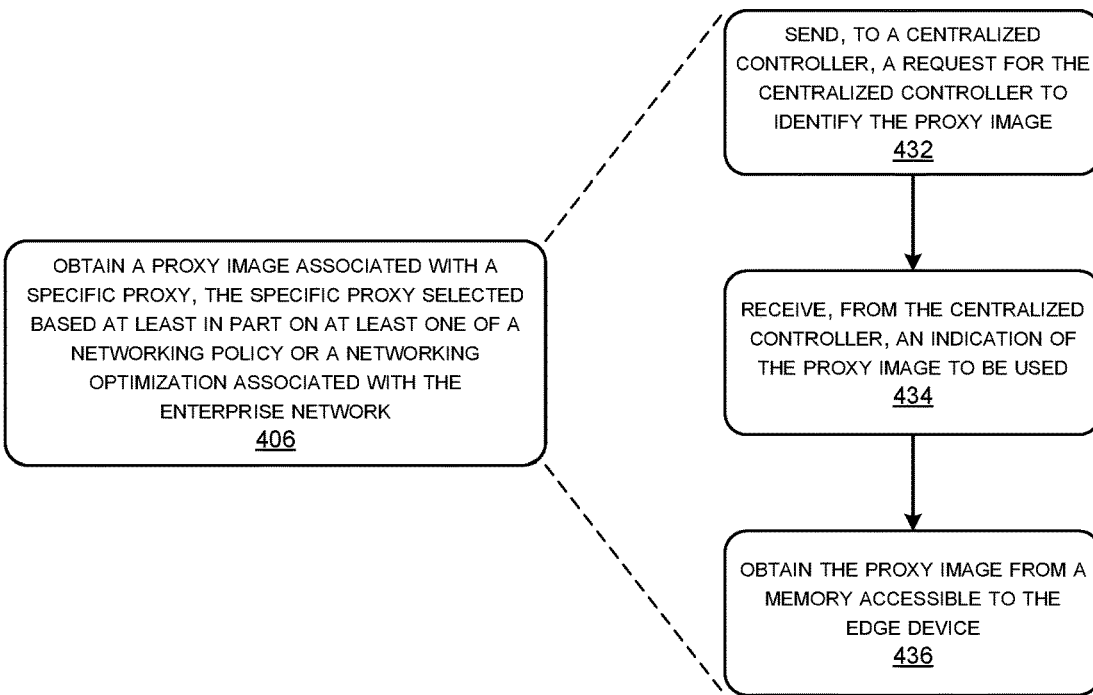
FIG. 4C is a flow diagram illustrating another example method associated with obtaining a proxy image.

FIG. 4C is a flow diagram illustrating another example method 430 associated with operation 406 of the method 400 for obtaining the proxy image associated with the specific proxy. In some examples, the method 430 may be performed in addition to or, alternatively from, the method 420.

The method 430 begins at operation 432, which includes sending, to a centralized controller, a request for the centralized controller to identify the proxy image. For instance, the edge device 106 of the first constituent network 202(1) may send the request to the controller 116 of the cloud-computing network. In some examples, the request may include a policy request 208.

At operation 434, the method 430 includes receiving, from the centralized controller, an indication of the proxy image to be used. For instance, the controller 116 may select or otherwise determine the proxy image based on the policy request 208 and/or the enterprise policy 122, and then send an indication of the proxy image that is to be used to the edge device 106.

At operation 436, the method 430 includes obtaining the proxy image from a memory accessible to the edge device. For instance, the edge device 106 of the first constituent network 202(1) may obtain the proxy image from a memory that is accessible to the edge device 106. For example, the proxy image may be frequently used by the edge device 106, and the edge device 106 may store the proxy image in a cache memory associated with the edge device 106 when not being used.

Figure 5:
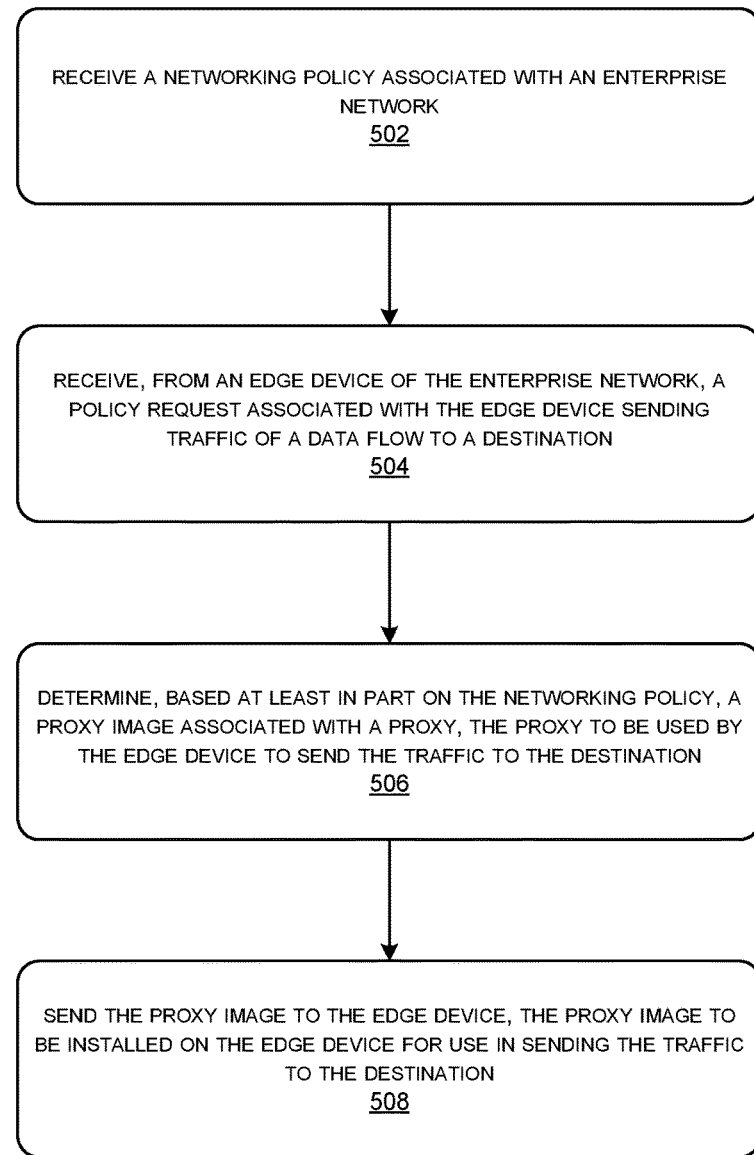
FIG. 5 is a flow diagram illustrating another example method associated with operationalizing a proxy function at an edge network node, while maintaining centralized intent and policy controls.

FIG. 5 is a flow diagram illustrating another example method 500 associated with operationalizing a proxy function at an edge network node, while maintaining centralized intent and policy controls. The method 500 begins at operation 502, which includes receiving a networking policy associated with an enterprise network. For instance, the controller 116 of the cloud-computing network may receive the enterprise policy 122 associated with the enterprise network 102 from the enterprise administrator(s) 120.

At operation 504, the method 500 includes receiving, from an edge device of the enterprise network, a policy request associated with the edge device sending traffic of a data flow to a destination. For instance, the controller 116 may receive the policy request 208 from the edge device 106 of the enterprise network 102. In some examples, the policy request may be a request for the controller to identify one or more security function(s) that are to be applied to the traffic. In some examples, the policy request may include an indication of a user device associated with the data flow, an indication of a destination of the traffic, an indication of a resource requested by the user device, an indication of a constituent network in which the user device resides, an indication of a network in which the destination resides, an indication of the protocol to be used, or the like.

At operation 506, the method 500 includes determining, based at least in part on the networking policy, a proxy image associated with a proxy, the proxy to be used by the edge device to send the traffic to the destination. For instance, the controller 116 may determine the proxy image 210 based at least in part on the enterprise policy 122, the policy request 208, a networking optimization, or the like.

At operation 508, the method 500 includes sending the proxy image to the edge device, the proxy image to be installed on the edge device for use in sending the traffic to the destination. For instance, the controller 116 may send the proxy image 210 to the edge device 106 of the enterprise network 102 to be installed on the edge device 106 for sending the traffic to the destination.

Figure 6:
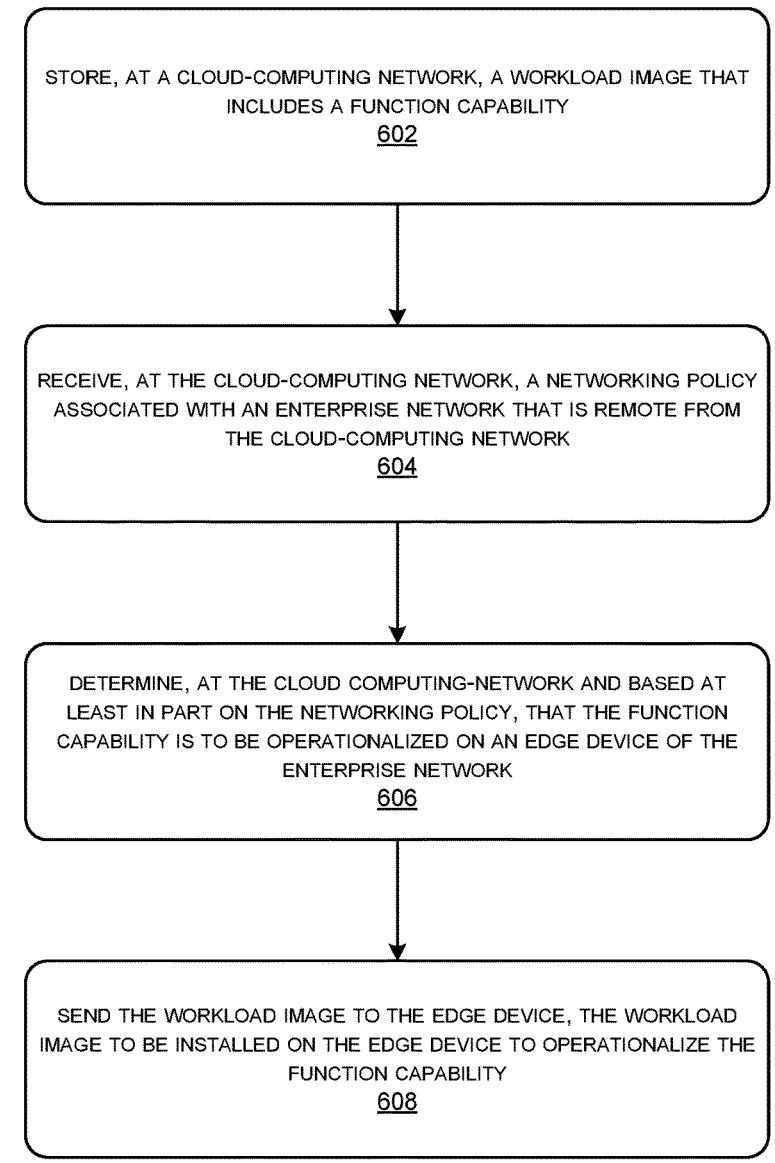
FIG. 6 is a flow diagram illustrating yet another example method associated with operationalizing a function capability at an edge network node, while maintaining centralized intent and policy controls.

FIG. 6 is a flow diagram illustrating yet another example method 600 associated with operationalizing a function capability at an edge network node, while maintaining centralized intent and policy controls. The method 600 begins at operation 602, which includes storing, at a cloud-computing network, a workload image that includes a function capability. For instance, the workload image 124 may be stored in the database 118 of the cloud-computing network 104. In some examples, the function capability may be a security function capability, a networking capability, a routing capability, or any other type of function capability.

At operation 604, the method 600 includes receiving, at the cloud-computing network, a networking policy associated with an enterprise network that is remote from the cloud-computing network. For instance, the enterprise policy 122 may be received by the controller 116 of the cloud-computing network 104. The enterprise policy 122 may be associated with the enterprise network 102, and sent by the enterprise administrator(s) 120.

At operation 606, the method 600 includes determining, at the cloud computing-network and based at least in part on the networking policy, that the function capability is to be operationalized on an edge device of the enterprise network. For instance, the controller 116 may determine, based on the enterprise policy 122, that the function capability included in the workload image 124 is to be operationalized on the edge device 106 of the enterprise network 102.

At operation 608, the method 600 includes sending the workload image to the edge device, the workload image to be installed on the edge device to operationalize the function capability. For instance, the controller 116 may send the workload image 124 to the edge device 106 to be installed on the edge device 106. In this way, the function capability can be operationalized on the edge device 106 of the enterprise network 102 itself, instead of relying on a connection to the cloud-computing network to utilize the function capability.

Figure 7:
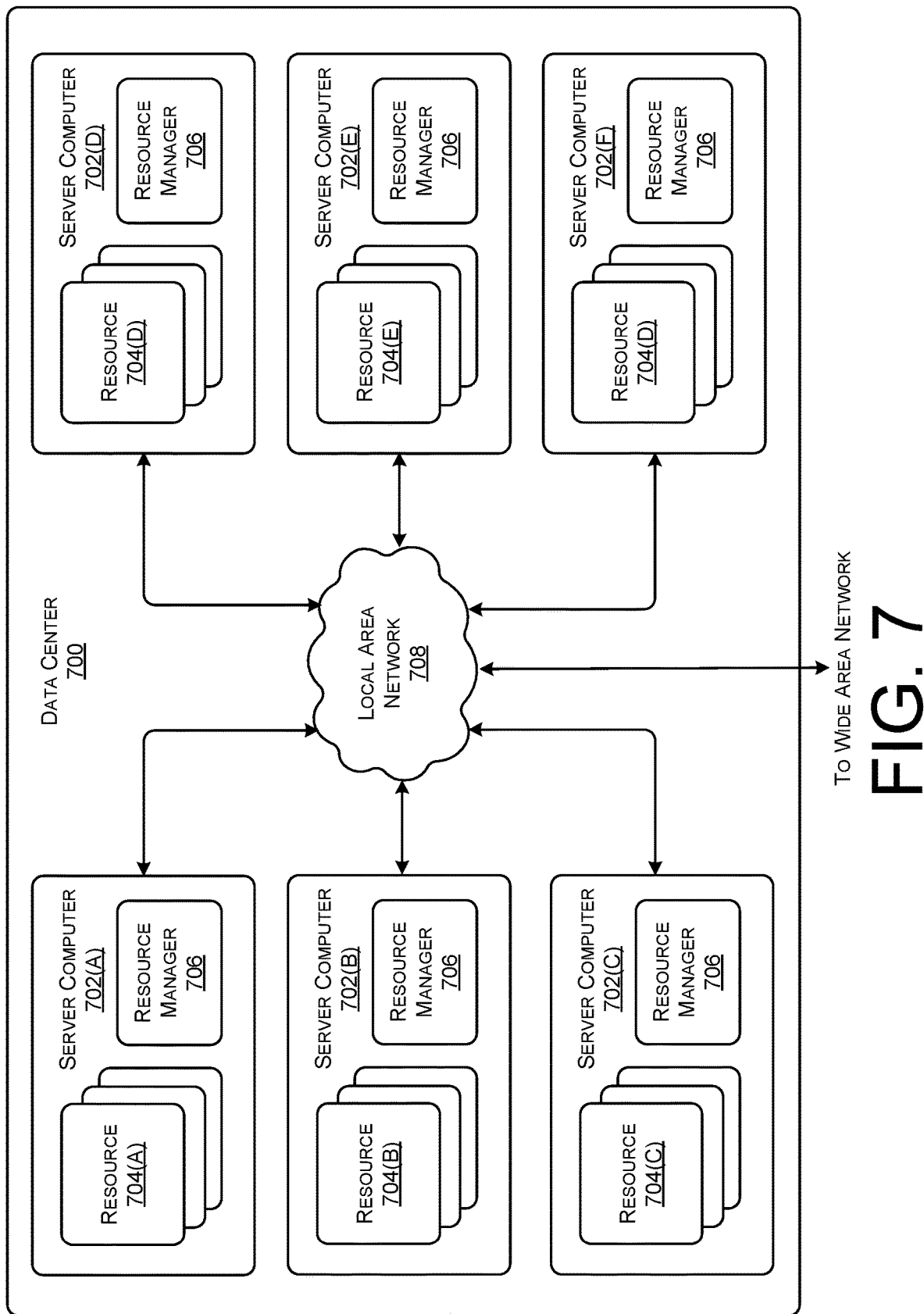
FIG. 7 is a computing system diagram illustrating an example configuration of a data center that can be utilized to implement aspects of the technologies disclosed herein.

FIG. 7 is a computing system diagram illustrating an example configuration of a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, any type of networked devices or nodes described herein. Although described as servers, the server computers 702 may comprise any type of networked device, such as servers, switches, routers, hubs, bridges, gateways, modems, repeaters, access points, etc. In some examples, the example data center 700 may correspond with the data center 114 described herein.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, security, packet inspection, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate local area network (LAN) 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein. In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like. The computing resources 704 may be utilized to run instances of secure access nodes or other workloads.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, secure access points, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
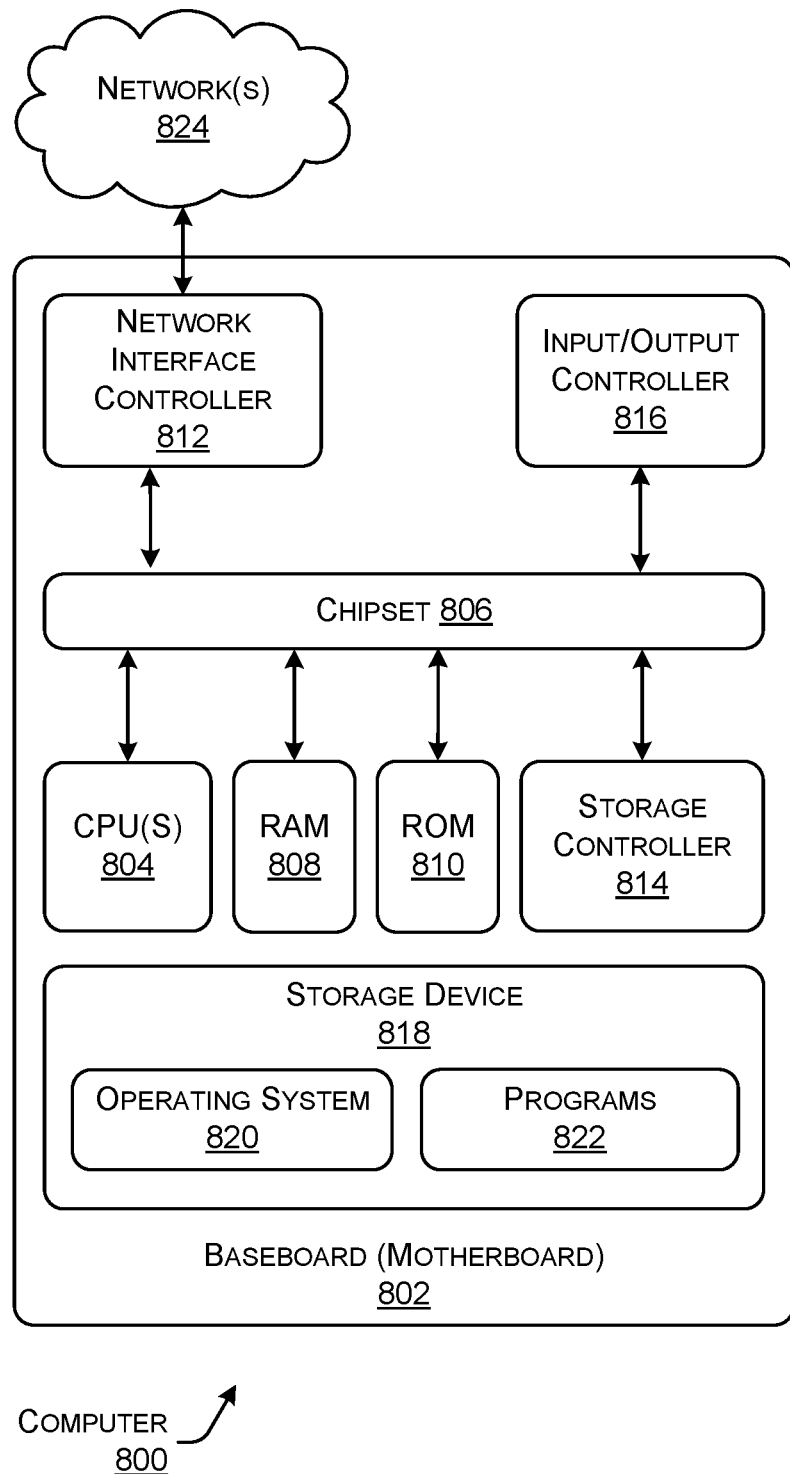
FIG. 8 is a computer architecture diagram showing an illustrative computer hardware architecture that can be utilized to implement aspects of the various technologies presented herein.

FIG. 8 is a computer architecture diagram showing an illustrative computer hardware architecture that can be utilized to implement aspects of the various technologies presented herein. The computer architecture shown in FIG. 8 illustrates a conventional server computer, network node, router, workstation, desktop computer, laptop, tablet, network appliance, e-reader, smartphone, load balancer, edge device 106, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network(s) 824 (e.g., the internet), the cloud-computing network 104, the enterprise network 102, the constituent networks 202, or the like. The chipset 806 can include functionality for providing network connectivity through a NIC 812, such as a gigabit Ethernet adapter. The NIC 812 is capable of connecting the computer 800 to other computing devices over the network 824. It should be appreciated that multiple NICs 812 can be present in the computer 800, connecting the computer to other types of networks and remote computer systems. In some examples, the NIC 812 may be configured to perform at least some of the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the architectures 100 and 200 and or any components included therein, may be supported by one or more devices similar to computer 800. Stated otherwise, some or all of the operations performed by the architectures 100, 200, and or any components included therein, may be performed by one or more computer devices 800 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes and functionality described above with regard to FIGS. 1-6, and herein. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors (processors) configured to execute one or more stored instructions. The processor(s) may comprise one or more cores. Further, the computer 800 may include one or more network interfaces configured to provide communications between the computer 800 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for operationalizing workloads at edge network nodes, while maintaining centralized intent and policy controls in a cloud-computing network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by an edge device of an enterprise network, the method comprising:
   receiving a packet associated with a data flow between the edge device and a destination, the edge device being in a constituent network associated with the enterprise network;
   determining that a proxy is to be installed on the edge device and used by the edge device to send the packet to the destination;
   sending, to a controller hosted on a cloud-computing network that is remote from the enterprise network, a request for the controller to select a proxy image associated with the proxy based at least in part on the at least one of a networking policy or a networking optimization associated with the enterprise network;
   obtaining, from the controller, the proxy image associated with the proxy;
   installing the proxy image on the edge device to operationalize the proxy; and
   causing the packet to be sent to the destination via the proxy, the proxy applying a policy to the packet without breaking encryption of the packet.

2. The method of claim 1, wherein obtaining the proxy image comprises:
   sending, to the controller hosted on the cloud-computing network, a request for the controller to (1) select the proxy image based at least in part on the at least one of the networking policy or the networking optimization and (2) send the proxy image to the edge device; and
   receiving the proxy image from the controller.

3. The method of claim 1, wherein obtaining the proxy image comprises:
   receiving, from the controller, an indication of the proxy image to be used; and
   obtaining, by the edge device and based at least in part on the indication, the proxy image from a memory that is accessible to the edge device.

4. The method of claim 1, wherein the proxy image runs on the edge device as at least one of a virtual machine, a container, or a serverless function.

5. The method of claim 1, wherein a protocol associated with the packet of the data flow comprises at least one of:

Hypertext Transfer Protocol (HTTP);
Quick user datagram protocol (UDP) Internet Connections (QUIC); or
Multiplexed Application Substrate over QUIC Encryption (MASQUE).

6. The method of claim 1, wherein the edge device is a router device of the constituent network of the enterprise network.

7. The method of claim 1, wherein a policy associated with the proxy comprises at least one of:
load balancing traffic;
caching;
allowing traffic to flow to the destination; or
denying traffic from flowing to the destination.

8. The method of claim 1, further comprising:
determining that the data flow is inactive; and
based at least in part on the data flow being inactive, uninstalling the proxy image from running on the edge device.

9. The method of claim 1, wherein the packet is a first packet of multiple packets of the data flow that are to be sent between the edge device and the destination, and wherein determining that the proxy is to be used is based at least in part on an inspection of the first packet.

10. The method of claim 1, wherein the packet includes an encrypted portion and the proxy is configured to route the packet toward the destination based on information that is outside of the encrypted portion of the packet.

11. The method of claim 1, wherein the proxy is configured to downgrade a protocol associated with the packet to enhance policy application between the edge device and the destination.

12. An edge device associated with an enterprise network, the edge device comprising:
one or more processors; and
one or more non-transitory computer-readable media storing instructions that, when executed by the one or more processors, cause the edge device to perform operations comprising:
receiving a packet associated with a data flow between the edge device and a destination, the edge device being in a constituent network associated with the enterprise network;
determining that a proxy is to be installed on the edge device and used by the edge device to send the packet to the destination;
based at least in part on determining that the proxy is to be used to send the packet, sending, to a controller hosted on a cloud-computing network that is remote from the enterprise network, a request associated with identifying a proxy image that is to be installed on the edge device;
receiving, from the controller, an indication of the proxy image that is to be installed on the edge device, the proxy image selected by the controller based at least in part on the request and at least one of a networking policy or a networking optimization associated with the enterprise network;
installing the proxy image on the edge device to operationalize the proxy; and
causing the packet to be sent to the destination via the proxy, the proxy capable of applying a policy to the packet without breaking encryption of the packet.

13. The edge device of claim 12, wherein the proxy image runs on the edge device as at least one of a virtual machine, a container, or a serverless function.

14. The edge device of claim 12, the operations further comprising obtaining, based at least in part on the indication, the proxy image associated with the proxy, the proxy image obtained from a memory that is accessible to the edge device.

15. The edge device of claim 12, wherein a protocol associated with the packet of the data flow comprises at least one of:
Hypertext Transfer Protocol (HTTP);
Quick user datagram protocol (UDP) Internet Connections (QUIC); or
Multiplexed Application Substrate over QUIC Encryption (MASQUE).

16. The edge device of claim 12, wherein the edge device is a router device of the constituent network of the enterprise network.

17. The edge device of claim 12, wherein the policy applied by the proxy comprises at least one of:
load balancing traffic;
caching;
allowing traffic to flow to the destination; or
denying traffic from flowing to the destination.

18. The edge device of claim 12, wherein the packet is a first packet of multiple packets of the data flow that are to be sent between the edge device and the destination, and wherein determining that the proxy is to be used is based at least in part on an inspection of the first packet.

19. The edge device of claim 12, wherein the packet includes an encrypted portion and the proxy is configured to route the packet toward the destination based on information that is outside of the encrypted portion of the packet.

20. The edge device of claim 12, wherein the proxy is configured to downgrade a protocol associated with the packet to enhance policy application between the edge device and the destination.

* * * * *